(12) United States Patent
Kaufmann et al.

(10) Patent No.: US 10,035,195 B2
(45) Date of Patent: Jul. 31, 2018

(54) TOOL HOLDER FOR TANGENTIAL CUTTING INSERT

(71) Applicant: Kennametal Inc., Latrobe, PA (US)

(72) Inventors: Igor Kaufmann, Nürnberg (DE); Anwar Sadat Mohideen Abdul, Nürnberg (DE)

(73) Assignee: KENNAMETAL INC., Latrobe, PA (US)

( * ) Notice: Subject to any disclaimer, the term of this patent is extended or adjusted under 35 U.S.C. 154(b) by 127 days.

(21) Appl. No.: 14/421,173

(22) PCT Filed: Aug. 27, 2013

(86) PCT No.: PCT/IB2013/002622
§ 371 (c)(1),
(2) Date: Feb. 12, 2015

(87) PCT Pub. No.: WO2014/033549
PCT Pub. Date: Mar. 6, 2014

(65) Prior Publication Data
US 2015/0246396 A1 Sep. 3, 2015

(30) Foreign Application Priority Data

Aug. 28, 2012 (DE) .................. 10 2012 017 025

(51) Int. Cl.
*B23B 27/16* (2006.01)

(52) U.S. Cl.
CPC .. *B23B 27/1622* (2013.01); *B23B 2200/0471* (2013.01); *B23B 2200/163* (2013.01); *B23B 2200/369* (2013.01); *B23B 2200/3681* (2013.01); *B23B 2205/12* (2013.01);
(Continued)

(58) Field of Classification Search
CPC ........ B23B 27/1622; B23B 2200/0471; B23B 2200/163; B23B 2200/3681; B23B 2200/369; B23B 2205/16; B23B 2205/12; B23B 2228/24; B23C 5/207;
(Continued)

(56) References Cited

U.S. PATENT DOCUMENTS

| 2,024,169 A | 12/1935 | Koonz |
| 4,831,674 A | 5/1989 | Bergstrom |
| 5,678,960 A | 10/1997 | Just |

(Continued)

FOREIGN PATENT DOCUMENTS

| CA | 2661450 C | 3/2015 |
| CN | 101668605 A | 3/2010 |

(Continued)

OTHER PUBLICATIONS

May 6, 2015 International Search Report Received.
(Continued)

*Primary Examiner* — Alan Snyder
(74) *Attorney, Agent, or Firm* — Matthew S. Bedsole (57) ABSTRACT

In the case of a tool holder having a receptacle for a cutting insert, in particular a tangential cutting insert having eight lips, having a lateral bearing surface, a rear bearing surface and a bottom surface, the bottom surface is quadrangular in plan view and has a raised supporting region which has two supporting surfaces, positioned obliquely with respect to one another, for the cutting insert.

15 Claims, 6 Drawing Sheets

(52) U.S. Cl.
CPC ....... *B23B 2205/16* (2013.01); *B23B 2228/24* (2013.01); *Y10T 407/22* (2015.01)

(58) Field of Classification Search
CPC ........ B23C 2200/164; B23C 2200/367; B23C 2210/166
See application file for complete search history.

(56) References Cited

U.S. PATENT DOCUMENTS

| | | | |
|---|---|---|---|
| 5,810,518 | A | 9/1998 | Wiman et al. |
| 5,820,310 | A | 10/1998 | Gideon |
| 5,888,029 | A | 3/1999 | Gideon |
| 5,924,826 | A | 7/1999 | Bystrom et al. |
| 6,238,146 | B1 | 5/2001 | Satran et al. |
| 6,309,149 | B1 | 10/2001 | Borschert |
| 6,918,718 | B2 | 7/2005 | Schwarz |
| 7,270,504 | B2 * | 9/2007 | Tubinger ................ B23B 51/04 408/144 |
| 7,819,610 | B2 | 10/2010 | Wallstrom et al. |
| 8,282,320 | B2 | 10/2012 | Hartlohner et al. |
| 8,449,224 | B2 | 5/2013 | Kobayashi |
| 8,454,278 | B2 | 6/2013 | Hartlohner et al. |
| 8,568,065 | B2 | 10/2013 | Neiman et al. |
| 9,144,849 | B2 | 9/2015 | Michelet et al. |
| 9,186,732 | B2 | 11/2015 | Michelet et al. |
| 2003/0175086 | A1 | 9/2003 | Muhlfriedel |
| 2006/0083594 | A1 | 4/2006 | Ejderklint |
| 2010/0119313 | A1 | 5/2010 | Hartlohner et al. |
| 2010/0158620 | A1 * | 6/2010 | Spitzenberger ......... B23C 5/006 407/40 |
| 2010/0296882 | A1 * | 11/2010 | Kobayashi ........... B23B 27/1614 407/100 |
| 2012/0121345 | A1 * | 5/2012 | Neiman .............. B23B 27/1622 407/103 |

FOREIGN PATENT DOCUMENTS

| | | | |
|---|---|---|---|
| CN | 101668606 | A | 3/2010 |
| CN | 101772390 | A | 7/2010 |
| CN | 102470447 | A | 5/2012 |
| CN | 105026084 | | 8/2017 |
| DE | 696 30 552 | T2 | 2/1996 |
| DE | 10 2007 022 535 | A1 | 5/2007 |
| DE | 11 2008 002 324 | T5 | 8/2008 |
| EP | 1 952 925 | A2 | 8/2008 |
| KR | 10-2012-0069820 | A | 6/2012 |
| KR | 1020120069820 | | 6/2012 |
| WO | 97/11806 | A1 | 4/1997 |
| WO | 2012/066529 | A1 | 5/2012 |
| WO | WO 2012059394 | A1 * | 5/2012 ............... B23C 5/08 |

OTHER PUBLICATIONS

May 26, 2016—First Office Action.
Jan. 25, 2017 Second Office Action.
May 5, 2017 Second Office Action.

\* cited by examiner

TOOL HOLDER FOR TANGENTIAL CUTTING INSERT

CLAIM TO PRIORITY

This application is the National Stage of International Application No. PCT/IB2013/002622, filed on Aug. 27, 2013, the entire contents of which is incorporated herein by reference.

FIELD OF THE INVENTION

The invention relates to a tool holder having a receptacle for a cutting insert, in particular a tangential cutting insert having eight lips, having a lateral bearing surface, a rear bearing surface and a bottom surface. The invention furthermore relates to an assembly having such a tool holder and a tangential cutting insert which is fitted in the receptacle of the tool holder and rests on the bottom surface.

BACKGROUND OF THE INVENTION

Tangential cutting inserts are known from the prior art. An example can be found in DE 10 2007 022 536 A1. The tangential cutting insert has two opposite, similar and substantially square bottom surfaces which are rotated with respect to one another. Formed along the outer peripheries of the bottom surfaces are four similar side surfaces, wherein in each case one main lip is formed at the transition from each side surface to the two bottom surfaces. Formed at the transition between adjacent side surfaces are secondary lips which merge into the respective main lip via a corner radius. A total of eight lips are formed which are available for cutting a material to be machined.

The geometry of the side surfaces is comparatively complex. One reason for this is that each side surface extends between the outer peripheries, rotated relative to one another, of the bottom surfaces. In addition, chip-forming geometries are realized on each side surface, the shape of the chips which are removed with the two lips of a side surface being influenced by said chip-forming geometries. The complex shape of the side surfaces makes it difficult to arrange the tangential cutting insert in the receptacle of the tool holder such that the forces that arise during cutting are introduced into the tool holder in the desired manner.

US 20100254776 A1 discloses a tangential cutting insert which has two frustoconical protrusions on each side surface, said frustoconical protrusions serving to support the tangential cutting insert in a receptacle of a tool holder. In addition to the fact that the protrusions complicate the production of the tangential cutting insert, they impair the chip flow on the side surfaces which represent the rake faces of the cutting insert.

SUMMARY OF THE INVENTION

The object of the invention is to improve a tool holder of the type mentioned at the beginning such that a cutting insert can be received reliably in the receptacle of the tool holder with little effort.

In order to achieve this object, in the case of a tool holder of the type mentioned at the beginning, the invention provides that the bottom surface is quadrangular in plan view and has a raised supporting region which has two supporting surfaces, positioned obliquely with respect to one another, for the cutting insert. The obliquely positioned supporting surfaces come into contact with a side surface of the cutting insert, such that the forces acting on the cutting insert can be transmitted reliably into the tool holder. In this case, self-centering of the cutting insert on the supporting surfaces occurs. Since the bottom surface is quadrangular and its geometry thus corresponds in principle with the geometry of the side surfaces of the cutting insert, the cutting edges of the cutting insert, which are located directly opposite the supporting region, can additionally be protected from damage by chips. For this purpose, the bottom surface can be configured in a slightly larger manner than the side surfaces of the cutting insert with little effort, such that the bottom surface protrudes slightly beyond the cutting insert.

Provision is preferably made for the supporting region to be set back with respect to the perimeter of the bottom surface. In this way, an encircling shoulder is created, above which the lips of the side surface which rests on the supporting region are located.

Provision is preferably made for the supporting region to have a raised ridge which separates the two supporting surfaces from one another. In this way, the self-centering of the cutting insert on the supporting region is improved.

The ridge extends in this case preferably diagonally over the supporting region. As a result, the automatic positioning of the cutting insert on the supporting region is supported.

According to one configuration of the invention, provision is made for the bottom surface to be part of a shim which is fitted to the tool holder. This makes it possible to produce the shim from a different material than the tool holder, such that the base surface can be produced with the desired properties with little effort.

The shim may be screwed to the tool holder, such that, if necessary, it can be exchanged with little effort. If the shim consists of carbide, the bottom surface can be produced with very high hardness such that there is no or only very little wear during operation.

The underside of the shim may have been ground in order to achieve a planar underside which maintains tight tolerances.

According to an alternative configuration of the invention, provision is made for the bottom surface to be configured in one piece with the tool holder. In this embodiment, separate mounting of the shim is dispensed with, and the tolerances which are associated with the attachment of the shim to the tool holder are also dispensed with.

In order to achieve the desired hardness of the supporting region, provision is preferably made for the bottom surface to be hardened, for example laser hardened or nitrided.

In order to achieve the abovementioned object, an assembly having a tool holder and a tangential cutting insert is also provided, with the bottom surface protruding outwardly beyond the cutting insert when viewed with respect to a plane which is defined by the exposed outer surface of the cutting insert. This ensures that the lips of the cutting insert, which are arranged along that side surface of the cutting insert which rests on the bottom surface, are protected against damage.

Provision is in this case preferably made for the length and the width of the bottom surface to be greater than the length and the width of the cutting insert supported thereon. This produces a protrusion of the bottom surface beyond the outer contour of the cutting insert both laterally and at the front, with the result that the lips of the cutting insert that face the bottom surface are protected.

Provision is preferably made for the cutting insert to have a plurality of cutting edges, with the cutting edges that face the bottom surface being arranged at a distance from the bottom surface. This ensures that the cutting edges cannot come into contact with the bottom surface of the receptacle, such that in this respect, too, the cutting edges are protected against damage. It is preferably provided that the transition portion, the front portion and/or the rear portion extend in a straight line. In this way, the cutting geometry between the main lip and the workpiece can be controlled easily.

BRIEF DESCRIPTION OF THE DRAWINGS

The invention is described in the following text with reference to two embodiments which are illustrated in the drawings, in which.

DETAILED DESCRIPTION OF THE INVENTION

FIGS. 1 to 14 show a tool holder 5 according to a first embodiment. It contains a holding portion 6 which is fitted on a shank 7 which is shown broken away here. The shank 7 can be mounted on a tool holder carrier.

The holding portion 6 of the tool holder 5 is provided with a receptacle 8 in which a cutting insert 9 (see FIGS. 10 to 14) can be fitted.

The receptacle 8 contains a lateral bearing surface 10, a rear bearing surface 12 and a bottom surface 14. The surfaces 10, 12, 14 serve to support the cutting insert 9.

The cutting insert 9 is a tangential cutting insert as is known in principle from DE 10 2007 022 536 A1. It has two base surfaces 20 which have a generally square shape and are rotated with respect to one another. Provided between the peripheries of the base surfaces 20 are four side surfaces 22, with each side surface forming two main lips 24 with the base surfaces. A secondary lip 26 is formed in each case at the transition between adjacent side surfaces 22. Each main lip 24 merges into the adjacent secondary lip 26 via a corner radius 28. Overall, the cutting insert 9 has eight lips which are each formed by a main lip 24 and a secondary lip 26 together with the corner radius 28.

In the first embodiment, the bottom surface 14 (the lower surface in FIG. 1) of the receptacle 8 is a shim 30 which is configured separately from the tool holder 5 and is fitted on the latter. In plan view, the shim 30 has a quadrangular and in this case generally parallelogram-like shape (see FIG. 5) and has a raised supporting region 32 which is surrounded by an encircling shoulder 34 which is located at a lower level than the supporting region 32.

The supporting region 32 is formed by two supporting surfaces 36, positioned obliquely with respect to one another, which have a generally triangular shape, and a raised ridge 38 arranged between the two supporting surfaces 36. Said ridge extends diagonally over the bottom surface 14, specifically along the longer diagonal (see FIG. 5). The two supporting surfaces 36 are in this case inclined at an angle of 10° with respect to a plane which is defined by the ridge 38 or the underside of the shim 30. As can be seen in particular in FIG. 8, in each case a part of the bottom surface 14 drops toward the longer side peripheries on account of the inclination of the two supporting surfaces 36 toward the outside, i.e. away from the ridge 38.

The shim 30 can consist of carbide or some other suitable material with a high degree of hardness. In this way, the desired wear resistance in particular of the bottom surface 14 is achieved. Preferably, the underside 40 of the shim 30 has been ground in order to obtain a particular planar bearing surface by way of which the shim 30 is supported in the tool holder 5. In order to fasten the shim 30, use can be made of a fastening screw (not shown here) which extends through a centrally arranged opening 42.

When the tangential cutting insert 9 is arranged in the receptacle 8, it is supported by way of one of its side surfaces on the bottom surface 14 of the shim 30, in particular on the two supporting surfaces 36. The latter are configured such that the cutting edges 24, 26, which are located directly opposite the shim 30, are located at a short distance from the shoulder 34 of the shim 30 (see in particular FIGS. 11 to 13 with the distance a indicated there).

Figure 1:
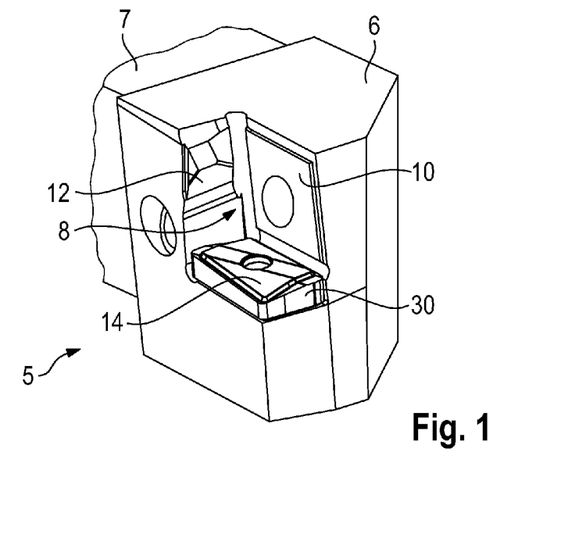
FIG. 1 shows a perspective view of a tool holder according to a first embodiment of the invention.
Figure 2:
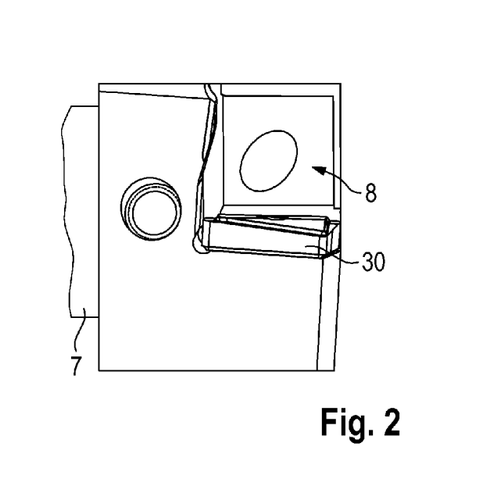
FIG. 2 shows a side view of the tool holder from FIG. 1.
Figure 3:
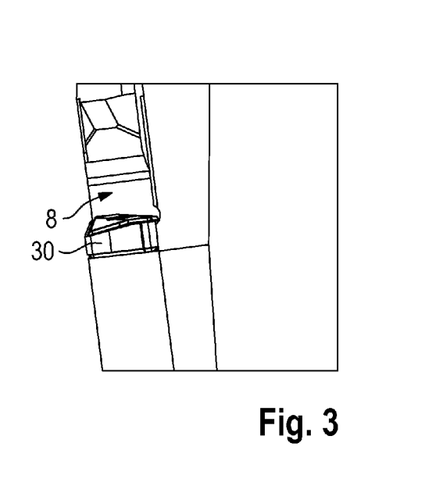
FIG. 3 shows a front view of the tool holder from FIG. 1.
Figure 4:
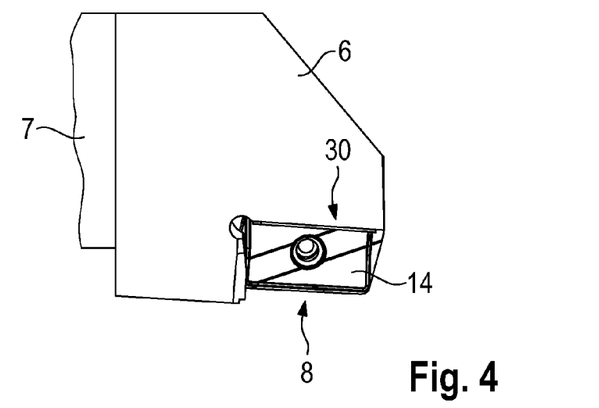
FIG. 4 shows a plan view of the tool holder from FIG. 1.
Figure 5:
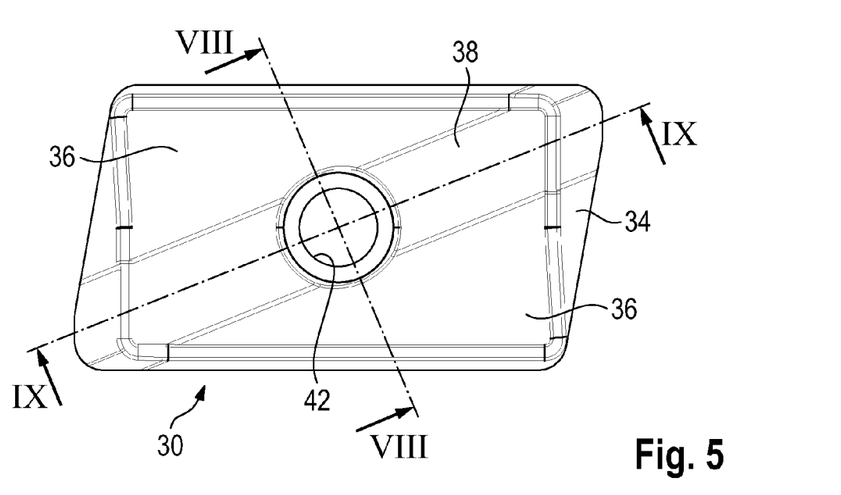
FIG. 5 shows a plan view of a shim which is used in the tool holder from FIG. 1.
Figure 6:
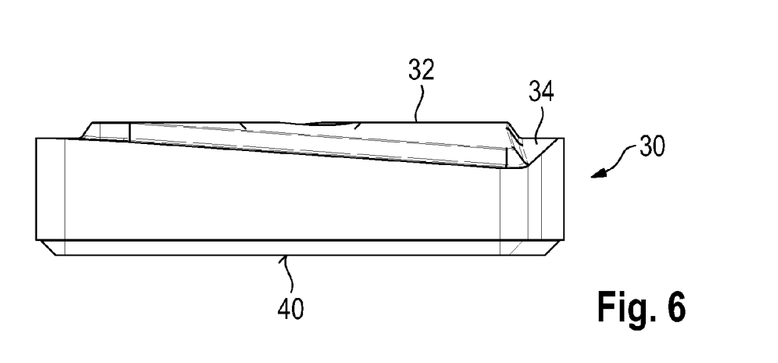
FIG. 6 shows a side view of the shim from FIG. 5.
Figure 7:
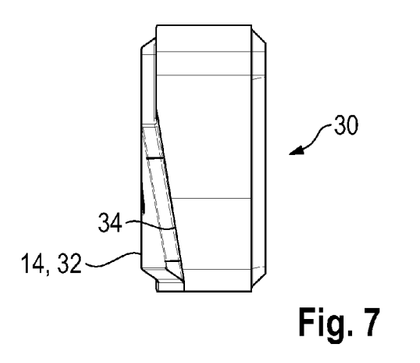
FIG. 7 shows a front view of the shim from FIG. 5.
Figure 8:
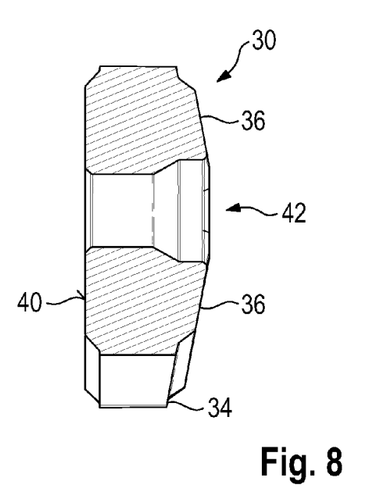
FIG. 8 shows a section along the plane VIII-VIII in FIG. 5.
Figure 9:
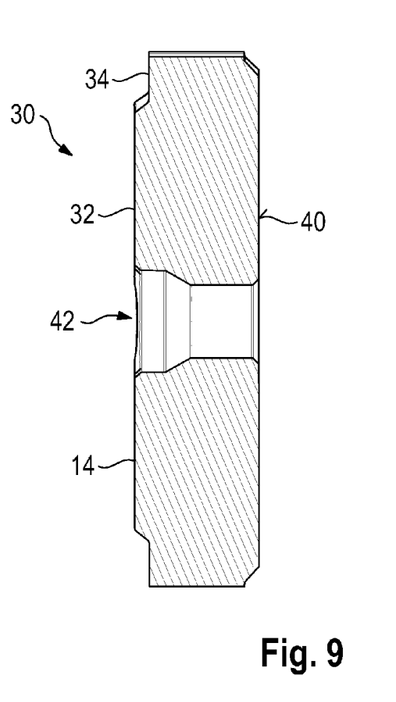
FIG. 9 shows a section along the plane IX-IX in FIG. 5.
Figure 10:
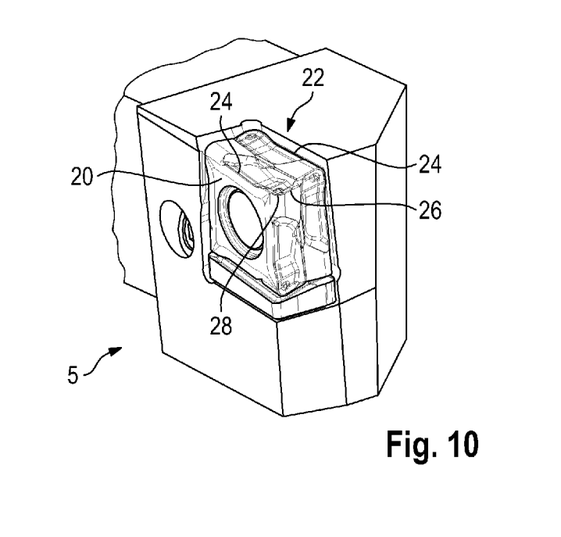
FIG. 10 shows a perspective view of the tool holder from FIG. 1 with a cutting insert fitted therein.
Figure 11:
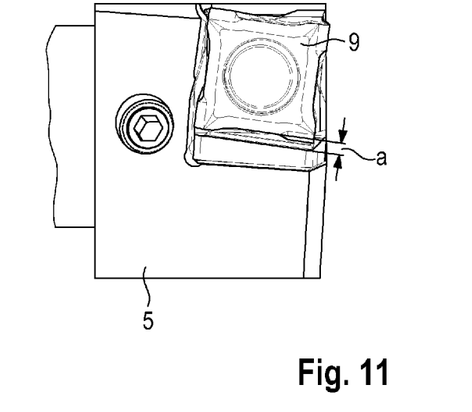
FIG. 11 shows a side view of the tool holder with a cutting insert from FIG. 10.
Figure 12:
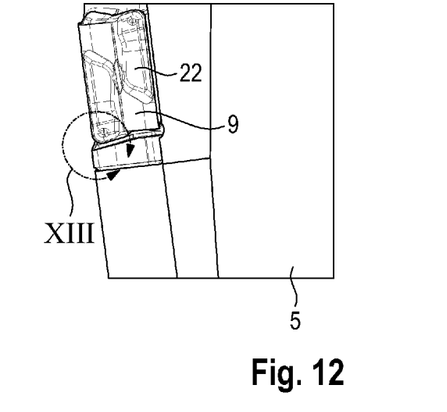
FIG. 12 shows a front view of the tool holder with a cutting insert from FIG. 10.
Figure 13:
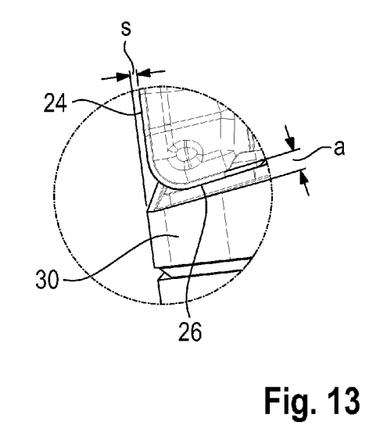
FIG. 13 shows the detail XIII from FIG. 12 on an enlarged scale.
Figure 14:
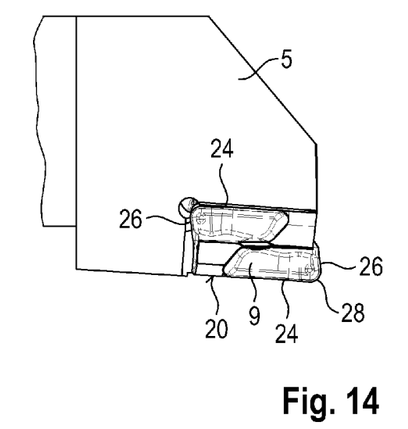
FIG. 14 shows a plan view of the tool holder with a cutting insert from FIG. 10.

With regard to its dimensions, the shim 30 is also configured such that it protrudes laterally beyond the cutting insert 9, in particular beyond a plane which is defined by the laterally arranged base surface 20 (see in particular FIG. 10) and also beyond the secondary lip 26 arranged on the front side of the tool holder. In FIG. 13, the lateral protrusion of the shim 30 beyond the plane defined by the corresponding base surface 20 (and thus also by the main lip 24 arranged there) is designated s. The shim 30 also protrudes forwardly, i.e. toward the observer with respect to FIG. 13, in the region of the secondary lip 26 shown in FIG. 13. As a result of the protrusion of the shim 30, the lips located opposite the shim 30 are protected well against damage by chips. In this case, the protrusion of the shim 30 is not disruptive during operation, since the inactive lips protected by the shim 30 are set back with respect to the active lips of the cutting insert; this is produced by the fitting, inclined in two directions, of the cutting insert 9 on the tool holder 5 (see FIGS. 11 and 12).

Figure 15:
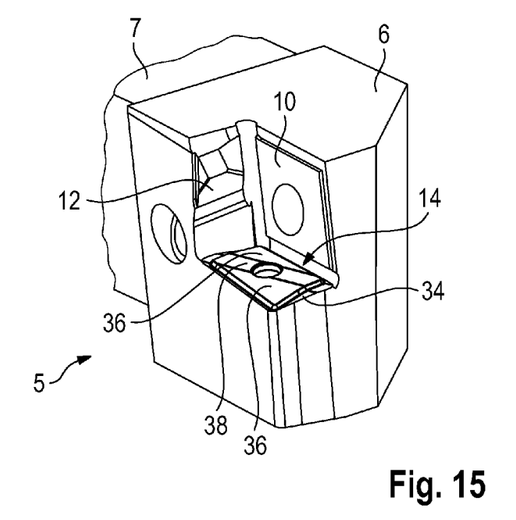
FIG. 15 shows a perspective view of a tool holder according to a second embodiment of the invention.
Figure 16:
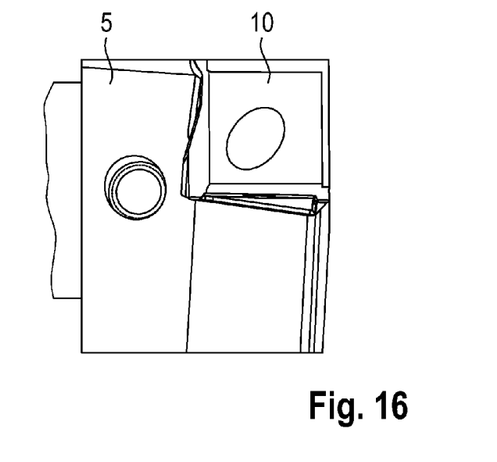
FIG. 16 shows a side view of the tool holder from FIG. 15.
Figure 17:
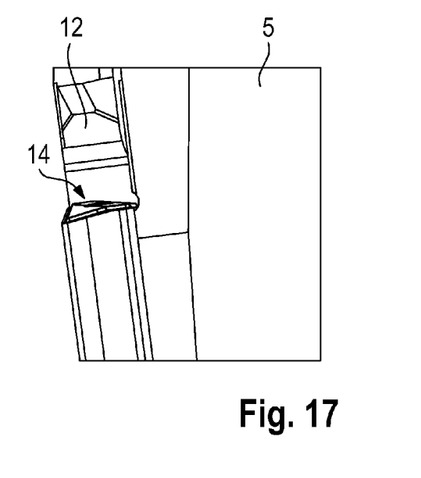
FIG. 17 shows a front view of the tool holder from FIG. 15.

FIGS. 15 to 17 show a tool holder according to a second embodiment. The same reference signs are used for the elements known from the first embodiment, and reference is made in this respect to the statements made above.

The difference between the first and second embodiments consists in that in the second embodiment the base surface 14 is configured as an integral constituent part of the tool holder 5, i.e. directly as one of the boundary surfaces of the receptacle 8. The geometry is the same as in the first embodiment; the base surface 14 thus has a raised supporting region with an encircling shoulder 34, two supporting surfaces 36 and the ridge 38.

In order to ensure the desired hardness of the base surface 14, the material of the tool holder 5 in the region of the base surface 14 is hardened, for example laser hardened, induction hardened or nitrided.

What is claimed is:

1. A tool holder having a receptacle for a cutting insert having eight lips, the tool holder comprising:
    a lateral bearing surface, a rear bearing surface, and a bottom surface,
    wherein the bottom surface is quadrangular in plan view and has a raised supporting region which has two supporting surfaces positioned obliquely with respect to one another, for the cutting insert;
    wherein the rear bearing surface has a raised, generally planar first surface and a plurality of generally planar second surfaces extending directly from the first surface, each of the second surfaces being disposed obliquely with respect to the first surface to form a truncated pyramidal shape; and
    wherein a geometry of the rear bearing surface differs from a geometry of the bottom surface.

2. The tool holder as claimed in claim 1, wherein a perimeter of the supporting region is offset from the perimeter of the bottom surface, defining a shoulder between the perimeter of the bottom surface and the perimeter of the supporting region.

3. The tool holder as claimed in claim 1, wherein the supporting region has a raised ridge which separates the two supporting surfaces from one another.

4. The tool holder as claimed in claim 3, wherein the ridge extends diagonally over the supporting region.

5. The tool holder as claimed in claim 1, wherein the bottom surface is part of a shim which is fitted to the tool holder.

6. The tool holder as claimed in claim 5, wherein the shim is screwed to the tool holder.

7. The tool holder as claimed in claim 5, wherein the shim is made of carbide.

8. The tool holder as claimed in claim 5, wherein an underside of the shim has been ground.

9. The tool holder as claimed in claim 1, wherein the bottom surface is configured in one piece with the tool holder.

10. The tool holder as claimed in claim 9, wherein the bottom surface has been hardened.

11. The tool holder as claimed in claim 10, wherein the bottom surface has been laser hardened, induction hardened or nitride.

12. An assembly having a tool holder as claimed in claim 1, further comprising a tangential cutting insert which is fitted in the receptacle and rests on the bottom surface, wherein the bottom surface protrudes outwardly beyond the cutting insert when viewed with respect to a plane which is defined by an exposed base surface of the cutting insert.

13. The assembly as claimed in claim 12, wherein the length and the width of the bottom surface are greater than the length and the width of the cutting insert supported thereon.

14. The assembly as claimed in claim 12, wherein the cutting insert has a plurality of cutting edges, with the cutting edges that face the bottom surface being arranged at a distance from the bottom surface.

15. The assembly of claim 12, wherein a perimeter of the supporting region is offset from the perimeter of the bottom surface, defining a shoulder between the perimeter of the bottom surface and the perimeter of the supporting region.

* * * * *